X5186 T
X5189 D 455/3 (4)
[redacted] [redacted]
Dec. 23, 1958 N. H. YOUNG, JR 2,866,088
RADIO COMMUNICATION WITHIN SHIELDED ENCLOSURES
Filed April 18, 1956
Breakin
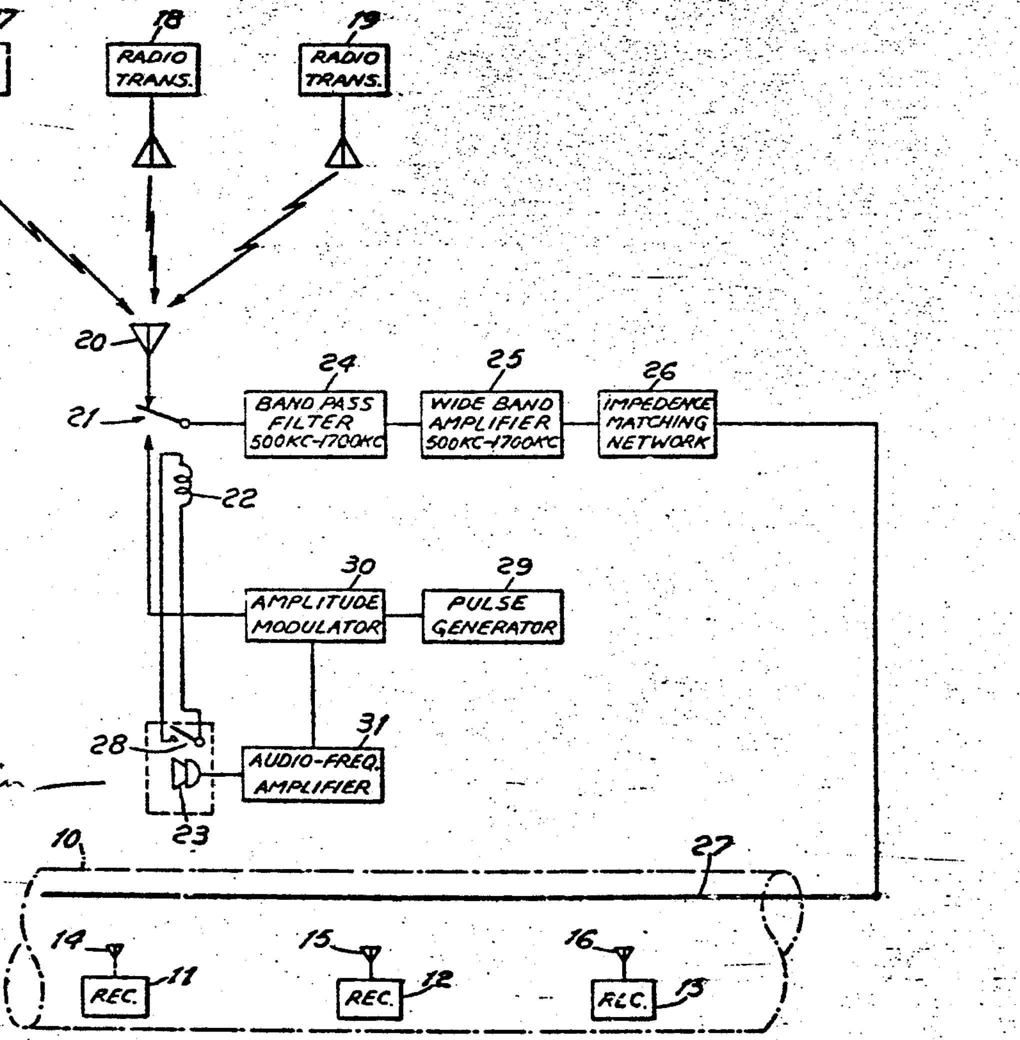
INVENTOR
NORMAN H. YOUNG, JR
BY [signature]
ATTORNEY United States Patent Office 2,866,088

Patented Dec. 23, 1958

2,866,088

RADIO COMMUNICATION WITHIN SHIELDED ENCLOSURES

Norman H. Young, Jr., Nutley, N. J., assignor to International Telephone and Telegraph Corporation, Nutley, N. J., a corporation of Maryland Application April 18, 1956, Serial No. 578,962

5 Claims. (Cl. 250—6)

This invention relates to radio communication systems, and more especially it relates to the broadcasting of signals within shielded environs such as tunnels, metal clad buildings, and the like.

A principal object of the invention is to provide an improved broadcast reception system and message break-in arrangement for communicating with a radio receiver located within a shielded area, such for example as within a vehicular tunnel and the like.

Another object is to provide a novel re-broadcast arrangement for enabling a wideband radio receiver, such for example as a standard broadcast frequency receiver, to receive standard broadcast signals while within a shielded area, such for example as a vehicular tunnel, while also enabling the receiver to receive special communication signals independent of the standard broadcast frequency signals and regardless of the tuned setting of the receiver.

A further object is to provide a novel duplex communication system which is particularly useful within shielded areas, such as vehicular tunnels, whereby special communication signals can be transmitted to vehicles in the tunnel even though the said receivers are differently tuned to different broadcast frequencies.

A feature of the invention relates to a system of communication specially adapted for vehicular tunnels or similar shielded areas, which system includes means to re-radiate throughout the length of the tunnel a full communication spectrum such as the standard broadcast frequency spectrum, and means to selectively connect said re-radiating means either to a receiving antenna located externally of the tunnel or to a special multi-carrier frequency generator which is locally modulated by special communication signals re-radiated within the tunnel over substantially the entire frequency width of said spectrum.

Another feature relates to the novel combination of elements whereby special communication signals can be broadcast on the standard broadcast frequency band, to moving vehicles passing through a shielded region, such as a tunnel or the like, while providing the vehicles with a substantially uniform re-radiated broadcast frequency spectrum when such special communication is not desired.

A further feature relates to the novel organization, arrangement, and relative location and interconnection of elements, whereby efficient standard broadcast service can be provided to vehicles within a tunnel or similar shielded area, while insuring that all such receivers which are tuned to any broadcast frequency are always in condition to receive special communication signals distinct from the standard broadcast signals.

Other features and advantages not specifically enumerated will be apparent after a consideration of the following detailed descriptions and the appended claims.

In the drawing there is shown, in schematic block diagram form, one typical embodiment of the invention.

The numeral 10 in the drawing represents in dot-dash line, any area or region which is shielded to a substantial extent against external electromagnetic radiations. It may represent, for example, a tunnel through which pass vehicles carrying respective radio receivers 11, 12, 13, etc., each of these receivers having its respective receiving antenna 14, 15, 16, etc. It will be assumed that the receivers are of the standard kind for receiving broadcast frequency signals. As is well known, even with sensitive receivers it is difficult to pick up and reproduce standard broadcast signals while moving through such a shielded area. That problem is particularly troublesome when the shielded area is in the form of a tunnel passing underneath water.

In the operation of vehicular tunnels, especially under water tunnels, it is considered desirable, and in some cases necessary, to provide means for transmitting special communication signals, such as traffic instruction signals, air-raid signals, etc., to the vehicles while they are passing through such a tunnel. A proposal has heretofore been made to use a single broadcast frequency, preferably at the low end of the signal broadcast frequency range and by using a special re-radiating transmitter tuned to that single frequency. With such an arrangement it is necessary to have signs at the tunnel entrance to advise the motorist to tune his vehicle radio to that particular frequency. Such a proposal is not effective to the desired extent because many motorists do not bother to tune their radio receivers to the notification frequency. In fact there is little incentive to do so because by such special tuning they are unable to continue hearing any program of the standard broadcast transmissions to which they had been listening just prior to entering the tunnel. Furthermore, where a special musical or other entertainment program is provided on this notification frequency, the incentive to tune thereto is reduced because the music or entertainment is necessarily of the recorded kind and in many cases the entertainment value thereof is quite low. It is clear then that it is highly desirable to allow the motorist to continue listening to his selected standard broadcast station while traversing the tunnel and yet allowing the tunnel authorities to interrupt such reception for the purpose of transmitting a special message to the motorist regardless of the broadcast channel to which his receiver is tuned. The present invention provides just such an arrangement.

In the drawing there are schematically represented by the numerals 17, 18, 19, three standard broadcast transmitters which may be located at widely different distances from the tunnel 10. Suitably located in the region of the tunnel, at a suitable noise-free location, is a broadcast frequency pick-up antenna 20, which is connected through a suitable two-way switch 21 which may be of the electromagnetically operated kind. For that purpose switch 21 may have an operating coil 22 connected through a suitable current supply circuit whose continuity is controlled, for example, by a push button on the microphone 23 which forms part of the tunnel authority's special communication equipment.

In one position of switch 21, which may be the normal position as shown in the drawing, the winding 22 is de-energized and the antenna 20 is connected to the input of a band pass filter 24 of any known design, for selectively and substantially uniformly passing the broadcast frequency band 500 kc. to 1700 kc. The output of the filter 24 is then passed through a wide band amplifier 25 designed to amplify substantially uniformly the signals in the 500 kc. to 1700 kc. range. The output of amplifier 25 is then connected through a suitable impedance matching network 26 to an antenna 27 located within the tunnel 10 and extending throughout the length thereof. With the switch 21 in its normal position, therefore, the radio receivers 11, 12, 13, etc. within the tunnel 10, can pick up any desired broadcast program from the transmitters 17, 18 and 19. If necessary, the filter 24 may be designed with special trapping circuits to prevent very strong broadcast signals from reaching such an amplitude as to cross-modulate with the signals from weaker stations in the broadcast band. The wide band amplifier 25 may be of conventional design but should introduce little, if any, distortion, and if desired it may be provided with well known negative feedback arrangements for that purpose.

When a tunnel authority desires to transmit a special communication to the vehicles in the tunnel, the push button switch 28 associated with microphone 23 is operated to cause energization of winding 22. This disconnects the external broadcast receiving antenna 20 from the elements 24 to 27. At the same time switch 21 connects the said elements 24—27 in circuit with a source of signal modulated multi-frequency carriers, all of which carriers are modulated by the audio-frequency signals from the microphone 23. Since it is necessary that all the receivers 11, 12, 13, etc. be capable of picking up signals as transmitted from the microphone 23, the said audio-frequency signals from microphone 23 are used to modulate the said series of radio frequency carriers, there being one such modulated carrier for each of the broadcast channels to which the receivers 11, 12, 13, etc. are capable of being tuned.

In accordance with the invention, these simultaneous carriers are derived from a pulse generator 29 which is capable of generating regularly recurrent extremely short pulses of energy having, for example, a build-up time and a decay time, each of which is not materially greater than one-half a microsecond, and with a pulse repetition rate of 10 kc. per second. As is well known, such a pulse generates frequencies at its fundamental rate as well as harmonic frequencies which are related to the fundamental frequency at spacings of 10 kc. These harmonics will include carrier frequencies in the band from 500 kc. to 1700 kc., namely the fiftieth to the one hundred seventieth harmonic of the 10 kc. fundamental frequency of each pulse. The 10 kc. recurrent pulse is then applied to any well known pulse modulator or mixer 30 which is also fed with the audio-frequency signals from microphone 23 after amplification in any well known audio-frequency power amplifier 31.

Such an arrangement provides a multiplicity of carriers at each 10 kc. interval above the fundamental frequency of the pulse generator 29. If desired, the pulse generator 29 may have its fundamental rate controlled by a quartz crystal (not shown) or similar frequency stabilizing device. Consequently there appear at the output of modulator 30 simultaneously a series of individual signal modulated carriers, including carrier frequencies in the band 500 kc. to 1700 kc., one for each of the broadcast channels from the transmitters 17, 18, 19, etc. By means of switch 21, these simultaneous signal modulated carriers are applied to the band pass filter 24 so as to delete all carrier frequencies outside the band 500 kc. to 1700 kc., and are then amplified in the wide band amplifier 25 and applied to the tunnel antenna 27 through the impedance matching network 26. The radio receivers 11, 12 and 13, etc., because of their relatively broad selectively, will have no tuning position where the modulation of the pulse train from the modulator 30 cannot be heard. In other words, regardless of the particular broadcast channel to which any receiver 11, 12, 12, etc. is tuned, it will necessarily pick up the special communication signals transmitted from the amplifier 23 without requiring any additional tuning of any of the said receivers.

Consequently these receivers can be left at any desired tuning position so that they are immediately capable of receiving the particular broadcast frequency from the appropriate transmitter 17, 18, 19, etc. when the special communications from the tunnel authority are discontinued by the deenergization of winding 22, as above described.

Various changes and modifications may be made in the disclosed embodiment without departing from the spirit and scope of the invention.

What is claimed is:

1. In a radio communication system of the kind arranged to receive selectively within a shielded region radio signals originating at any one of a number of separate radio transmitters arranged to transmit signals in respective radio frequency channels within a predetermined frequency channel band, a transmitting antenna located within said region, pick-up means to receive signals from all said radio transmitters, carrier generator means for simultaneously generating at one source a plurality of carrier frequencies within said band, a source of audio frequency signals, means for simultaneously modulating all said carrier frequencies by said audio frequency signals, and means for selectively energizing said antenna by signals from said pick-up means or by signals from said carrier generator means.

2. In a radio communication system of the kind arranged to receive selectively within a shielded region such as a vehicular tunnel signals originating at any one of a number of broadcast frequency transmitters, a pick-up antenna for said broadcast frequencies, a band pass filter for selectively passing substantially only said broadcast frequencies, a transmitting antenna within said shielded region, a carrier frequency generator for simultaneously generating a plurality of carrier frequencies within the broadcast frequency band, a source of audio frequency signals, means for simultaneously modulating all said carrier frequencies by said audio frequency signals, a selectively operable switch for applying to the input of said filter the signals from said pick-up antenna or the said simultaneously modulated carrier frequencies, and means connecting the output of said filter to said transmitting antenna.

3. A radio communication system according to claim 2, in which said carrier frequency generator comprises a pulse generator for generating extremely short pulses having a repetition rate which is higher than the audio frequency modulations from said broadcast transmitters.

4. In a radio communication system of the kind arranged to receive radio signals within a shielded region such for example as a vehicular tunnel having therein a radio receiver which can be arbitrarily tuned to receive any frequency channel within the established broadcast frequency band, an antenna within said region for re-radiating frequency signals in said broadcast frequency band to said receiver, and means to apply to said antenna a plurality of simultaneous radio carrier frequencies derived from a single pulse generator, which carrier frequencies are simultaneously modulated by a special communication signal, whereby said receiver can pick up said special signal regardless of the broadcast frequency to which it has been arbitrarily tuned.

5. In a radio communication system of the kind arranged to receive radio signals within a shielded region such for example as a vehicular tunnel having therein a radio receiver which can be arbitrarily tuned to receive any frequency within the established broadcast frequency band, a transmitting antenna within said region, a pulse generator for generating sharp pulses having a predetermined recurrence rate, each pulse generating an extended harmonic frequency spectrum of the fundamental pulse rate and including carrier frequencies within the broadcast frequency band, a source of audio frequency signals, a modulator for modulating all said frequencies from said pulse generator simultaneously by said audio frequency signals, a two-position switch, said switch having means to operate it to one position wherein said modulated carrier frequencies are connected to the input of a band pass filter for passing only carrier frequencies within the broadcast band, a wide band amplifier connected to the output of said filter, an impedance matching network connecting the output of said amplifier to said antenna, another pick-up antenna for broadcast frequency signals located at a substantially noise-free location, said switch when operated to its second position completing a connection between said pick-up antenna and the input of said band pass filter while disconnecting the said amplitude modulated carriers from the input of said filter.

References Cited in the file of this patent

UNITED STATES PATENTS

| | | |
|---|---|---|
| 2,259,316 | Lyle | Oct. 14, 1941 |
| 2,407,417 | Halstead | Sept. 10, 1946 |
| 2,477,570 | Berg | Aug. 2, 1949 |
| 2,508,853 | Bond | May 23, 1950 |
| ~~2,514,367~~ | ~~Bond~~ | ~~July 11, 1950~~ |
| 2,548,796 | Houghton | Apr. 10, 1951 |
| 2,559,613 | Halstead | July 10, 1951 |
| 2,640,973 | Cleaver et al. | June 2, 1953 |